Nimmo & Stenton.
Furnace for Heating and Welding Metal.
Nº 43,127. Patented Jan. 14, 1864.

Witnesses:

Inventors:
George Nimmo
R. S. Stenton

UNITED STATES PATENT OFFICE.

GEORGE NIMMO, OF JERSEY CITY, NEW JERSEY, AND ROBERT S. STENTON, OF NEW YORK, N. Y.

IMPROVED FURNACE FOR HEATING AND WELDING.

Specification forming part of Letters Patent No. 43,127, dated June 14, 1864.

*To all whom it may concern:*

Be it known that we, GEORGE NIMMO, of Jersey City, county of Hudson, and State of New Jersey, and ROBERT S. STENTON, of New York city, county, and State, have invented a new and improved furnace for heating and welding steel or iron, or compounds of steel and iron; and we do hereby declare that the following is a full and exact description thereof, reference being had to the accompanying drawings, and to the letters of reference marked thereon.

Figure 3:
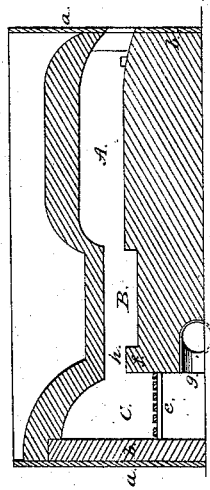
Figure 4:
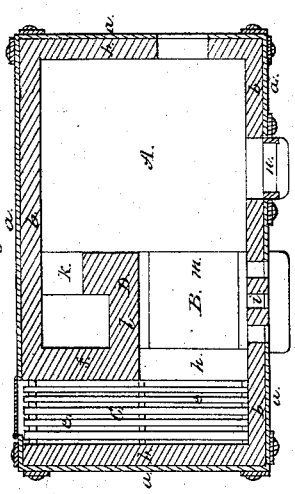
Figure 5:
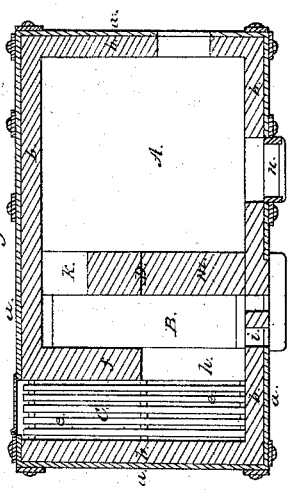
Figure 1:
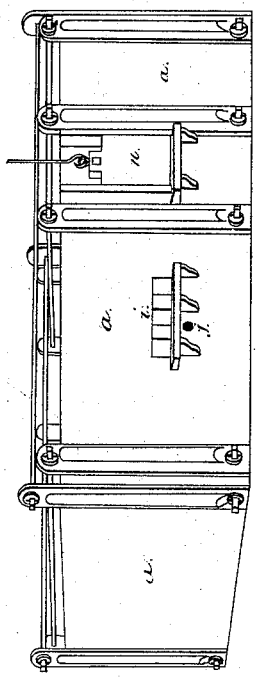
Figure 2:
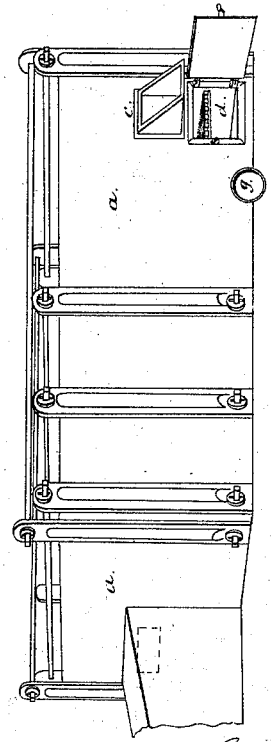

Figure 1 is a front elevation. Fig. 2 is a rear elevation. Fig. 3 is a perpendicular section. Fig. 4 is a horizontal section for heating short bars, ingots, &c. Fig 5 is a horizontal section for heating long bars.

The nature of this invention consists in so constructing a furnace that with the same fuel we can at the same time obtain the different degrees of heat required both for heating and welding, and also when required prepare the metal by giving it a gentle gradual soaking heat, before subjecting it to the more intense heat required for welding, and thereby economize both time and fuel.

To enable others skilled in the art to make and use this invention, we proceed to describe its construction.

A furnace is constructed with what may be denominated three compartments or divisions: $c$ is the fire-place to contain the fuel; B, the first heating and the welding compartment, into which heat and flame is first conducted; A, the second heating-compartment, into which the heat and flame is conducted after passing through compartment B.

In constructing this furnace the usual foundation is first put down, upon which are erected cast-iron plates for front and back and sides bolted together by binding-bolts in the usual manner ($a$ Fig. 1, 2, 3, 4, 5,) with apertures therein for the doors, and flue required for compartments A and C, and for the hole or holes and slag escape required for compartment B. We build around the interior of these plates a brick wall, $b$, with one course of brick, using fire-bricks when the same is in immediate contact with the fuel or the flame, leaving in the usual manner the necessary recesses in the brick-work for the binding-bolts required to connect the cast-iron plates. The compartment C to contain the fuel is built of and covered with one course of brick all round, using for fire-chamber fire-bricks. At the back of the furnace we place the door $c$, Fig. 2, for the introduction of the fuel, and immediately under the same the door $d$, Fig. 2, for the ash-place. The grate-bars $e$, Figs. 3, 4, 5, extend from the front to the back of the fire-place, and are supported at each end and in the middle by three cross-bars let into the brick-work for that purpose. Between the compartments C and B we build the interior wall, $f$, Figs. 3, 4, 5, in which and underneath the grate-bars is left a hole, $g$, Fig. 2 and 3, for the passage of the blast from a blower placed outside of the furnace as may be convenient, but not requiring to be shown in the accompanying drawings. At the upper part of the interior wall, $f$, is the passage $h$, Figs. 3, 4, 5, for the entrance of the flame from the fire-place C to the compartment B of from two to six inches or more in height, and from twelve to almost the full depth of the furnace in length, as may be found expedient, according to the size and length of the bars, ingots, blooms, or piles required to be introduced into the furnace, the roof is narrowed from the end wall of the furnace until it meets the roof of compartment B at the aperture $h$.

The first heating and the welding compartment B is built and covered with one course of fire-brick all round, and of the length needed to receive the bars, ingots, blooms, or piles requiring to be heated therein with one, two, or more holes or doors through the fire-brick and front iron plate, $i$, Fig. 1, for introducing the metal and for the slag-escape. Across and at a suitable distance from the front of compartment B is placed a row of fire-bricks, or of other suitable materials, upon which to rest one end of the metal, the other end resting upon bricks similarly placed across and close against the front of the furnace, by which means the flame is allowed to have free play all around the metal exposed to its action. At about the level of the floor of compartment B is left a hole from one to four inches, round or square, $j$, Fig. 1, through the wall and iron plate, by which to tap the furnace and allow any accumulation of slag to escape.

The bulk-head or interior wall, D, Fig. 4 or 5, is a prominent and distinguishing feature in this furnace. By it all the heat from the fire in compartment C is first concentrated in compartment B. It will necessarily vary in size according to the length or number of the bars, ingots, piles, or blooms introduced into compartment B. Fig. 5 represents an illustration of this and shows an arrangement of the communication from A to C, different from that in Fig. 4. The heat and flame, instead of passing directly, is passed angularly across compartment B from $h$ to another opening, $k$, Figs. 4 and 5, left in the bulk-head D for that purpose. The furnace is thus adapted for heating or welding the longest bars it has capacity to receive. When the bulk-head or interior wall, D, is thus constructed a portion of the inside wall at $l$, Fig. 4, should be removed and the opening $m$, Fig. 4, should be closed, Fig. 5. Where one furnace is used for both long and short pieces of metal, these portions of wall can be built temporarily with loose fire-birck and changed at pleasure.

The second heating-compartment, A, Figs. 3, 4, and 5, into which the flame and heat is conducted after having passed through compatrment B, is constructed of one course of fire-brick all round, and is partially divided from compartment B by the interior wall or bulk-head D. The roof, built of fire-brick, is arched and is depressed and narrowed at the end opposite to compartment B, the floor near the flue being also similarly depressed. This, however, is not essential. Decreasing in size as they approach the outlet into the flue or chimney, the floor is raised somewhat above the level of that of compartment B, that the slag accumulating in compartment B may not overflow upon it. To introduce metal into this compartment we leave a space in the brick wall and iron plate for the door $n$, Figs 1, 4, 5.

Furnaces of this description may be built of different sizes to accord with the number or size of the pieces or piles of metal that it may be found expedient or economical to work at the same time. These drawings represent a furnace ten and a half feet in length, six feet in breadth, four and one-half feet in height. The drawings are on a scale of one-half of an inch to the foot.

It will be clearly evident that all the heat conducted to and contained in compartment A, and that has heretofore been allowed to pass out from a flue attached to C or B, is by this means used to great advantage. Ingots or bars of steel or iron, piles of steel or iron, or of steel and iron, or blooms of iron, or blocks of metal of any kind requiring to be heated before being hammered or rolled are without any extra cost for fuel prepared for the more intense heat generated in compartment B.

When found desirable, we can pass the air-pipe from the blower outside through compartment A before conducting it to the vent $q$, and thereby obtain a hot-blast.

A furnace thus constructed is not applicable for puddling purposes, and no claim is here made for it for such use.

We claim—

The combination of the heating-compartment A with the heating and welding compartment B and the fire-place C, constructed and arranged substantially as, in the manner set forth, and for the purposes specified.

GEORGE NIMMO.

Witnesses:
R. S. STENTON.
N. C. WOOSTER,
L. PITKIN.